United States Patent [19]

Ferguson

[11] Patent Number: 4,765,523

[45] Date of Patent: Aug. 23, 1988

[54] MULTIPOSITION TRACTOR LID

[75] Inventor: Gregory A. Ferguson, New Bedford, Mass.

[73] Assignee: Precision Handling Devices, Inc., Fall River, Mass.

[21] Appl. No.: 94,367

[22] Filed: Sep. 8, 1987

[51] Int. Cl.[4] .......................... G03B 1/30; E05D 15/06

[52] U.S. Cl. .................................... 226/74; 400/616.2; 16/361

[58] Field of Search .......................... 16/297, 361, 374; 226/74, 75, 170; 400/616.1, 616.2, 616

[56] References Cited

U.S. PATENT DOCUMENTS

| | | | |
|---|---|---|---|
| 2,478,529 | 8/1949 | Farr et al. | 16/361 X |
| 2,566,915 | 9/1951 | Young | 16/361 X |
| 2,666,946 | 1/1954 | Miller | 16/361 |
| 2,704,063 | 3/1955 | Young | 16/361 X |

*Primary Examiner*—David Werner

*Attorney, Agent, or Firm*—Martin LuKacher

[57] ABSTRACT

A document feed tractor has a multiposition lid which is held by projections from the frame of the tractor in open position to enable loading of the perforated document (paper) in the tractor. The lid is pivotally mounted in openings in the projections which enable lid to be both rotated and translated from the open position over the projections, which then define ledges holding up the lid, to closed position when the lid is moved over the edges of the ledges. Then, the lid can snap down under a spring bias to the closed position where it confines the document on the tractor belt.

7 Claims, 4 Drawing Sheets

MULTIPOSITION TRACTOR LID

DESCRIPTION

The present invention relates to document feed tractors, and particularly to an improved lid structure for such tractors.

Document feed tractors are used to feed perforated documents (paper) and have lids which confine the paper on the belt from which pins extend into perforations in the paper. A pair of tractors is provided along opposite edges of the paper and received perforations in the paper along its opposite edges. These lids must be moved from an open position to enable the paper to be loaded on the pins in the tractor to closed position where the lid confines the document on the belt.

It is desirable to make loading of the document as simple as possible with minimal manipulation of the tractor lid. The lid must also be positively located in closed position. Accordingly, light forces on the lid against which the lid could be moved away from closed position are not practical.

In typical tractors such as shown, for example, in U.S. Pat. No. 4,611,737 issued to Hubbard and Kerivan on Sept. 16, 1986 or in U.S. Pat. Nos. 3,825,162; 4,129,239 or 4,199,091 issued to Leo J. Hubbard, and Xactron (R) tractors offered for sale by Precision Handling Devices, Inc. of Fall River, Massachusetts, U.S., lids are pivotally mounted on pins extending from trunnions which project from the frame of the tractor. The lids are spring biased so that they can pivot from closed position and toggle, extending the spring, when pivoted to open position. The open position is at least 90° from the closed position.

Other mechanisms have been suggested for locating lids in open and closed position. These include spring detents which are engaged by and latched with members projecting from the lid. Such a detent structure is shown in Hubbard et al, U.S. Pat. No. 4,457,463 issued July 3, 1984. Other types of spring detents are shown in U.S. Pat. Nos. 4,650,358 and 4,614,287. Various shoes for motion picture film sprockets which are pivotal have also been suggested. In this connection see U.S. Pat. Nos. 2,422,310, 2,144,210; 2,733,062; 2,608,406 and 2,674,454. Some of these shoes, as in the last mentioned patent, also use spring detents to hold the shoe in open or closed positions. In U.S. Pat. Nos. 2,608,406 and 2,733,062 the shoe is both translatable and pivotal, but must be held in open position by hand.

A simple and easily manipulatable lid structure which is self holding in open position, can maintain an open position of less than 90° away from its closed position, and can readily be actuated to closed position with a flick of a finger has been provided in accordance with this invention.

Briefly described, the improved lid structure has a lid member which is mounted on the tractor frame for movement between open and closed positions. The mounting is provided by trunnions which extend in side by side relationship from the lid and from the frame. The lid trunnions have openings larger than pins which extend from the frame trunnions. Conversely the lid trunnions can carry the pins, while the frame trunnions have the enlarged holes. This connection provides a coupling which permits translation as well as rotation of the lid with respect to the frame. The lid is spring biased towards closed position. The frame has projections which present ledges to edges of the lid. When translated rearwardly these ledges support and hold the lid in open position. With a simple flick of the finger the lid can be pushed, tripped over the ledges and located positively by the spring to a position spaced with the requisite gap from the moving belt of the tractor.

The foregoing features, objects and advantages of the invention as well as a presently preferred embodiment thereof, will become more apparent from the reading of the following description and connection with the accompanying drawings in which.

Figure 3:
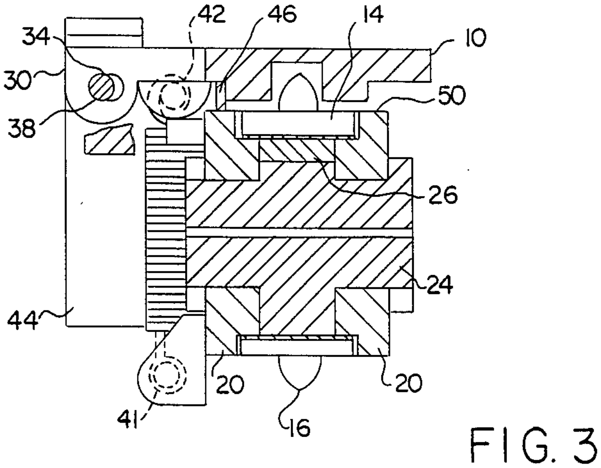
Figure 4:
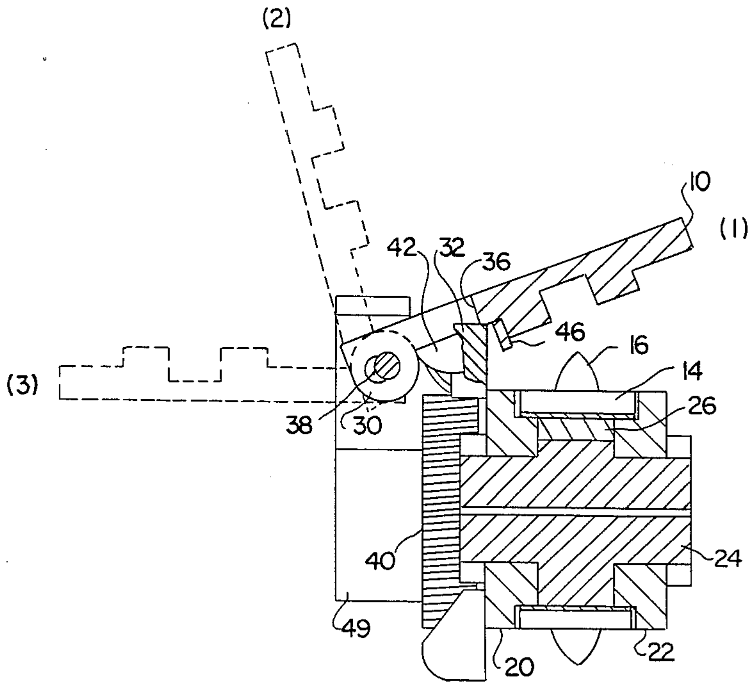
Figure 5:
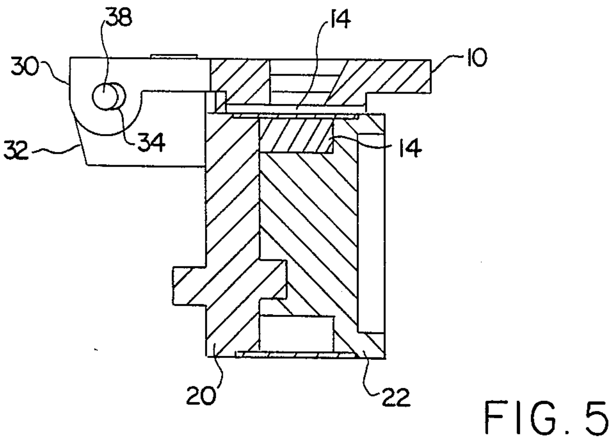

FIGS. 3, 4 and 5 are sectional views taken along the lines 3—3, 4—4 and 5—5, respectively; the section of FIG. 4 showing the lid in a plurality of its open positions.

Referring to the drawings there is shown a tractor which, except for its lid structure, is similar in design to the Xactron (R) tractors which are available from Precision Handling Devices, Inc. Such tractors are shown in several of the above referenced patents. The tractor has a lid 10 with a slot 12 through which the tractor belt 14 with its pins 16 may be seen. The lid also has a frame 18 with side plates 20 and 22. The plates come together and define a guidance structure for the belt 14 as described in U.S. Pat. No. 3,825,162. The belt is driven by a sprocket 24 which engages lugs 26 on the inside of the belt 14.

The tractor may be laterally moved so as to set the spacing between tractors of a tractor pair by means of a collet clamp locking mechanism 28. This mechanism is described in U.S. Pat. No. 4,129,239.

Figure 1:
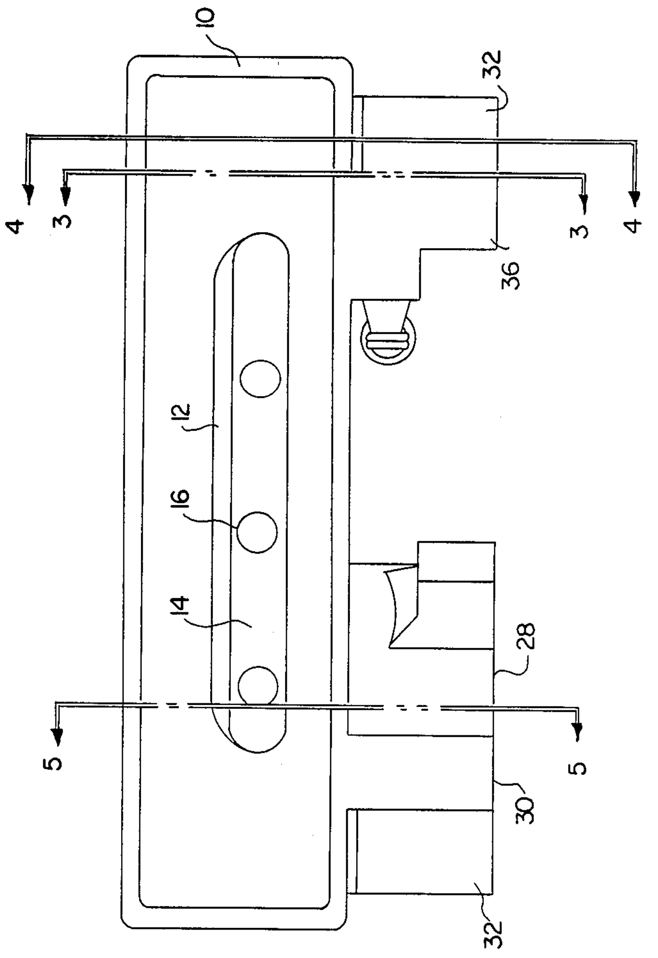
FIG. 1 is a plan view of a document feed tractor embodying the invention.

The lid has trunnions 30 or ears which project from the lid towards the outside of the tractor (the bottom in FIG. 1 and the left in FIGS. 3, 4 and 5). These lid trunnions 30 are in side by side relationship with trunnions 32 which project from the frame. The frame trunnions 32 define ledges (see FIG. 4) upon which an outside edge 36 of the lid can rest when the tractor is in one of its open positions. This position is labelled with the numeral (1) in FIG. 4.

Figure 2:
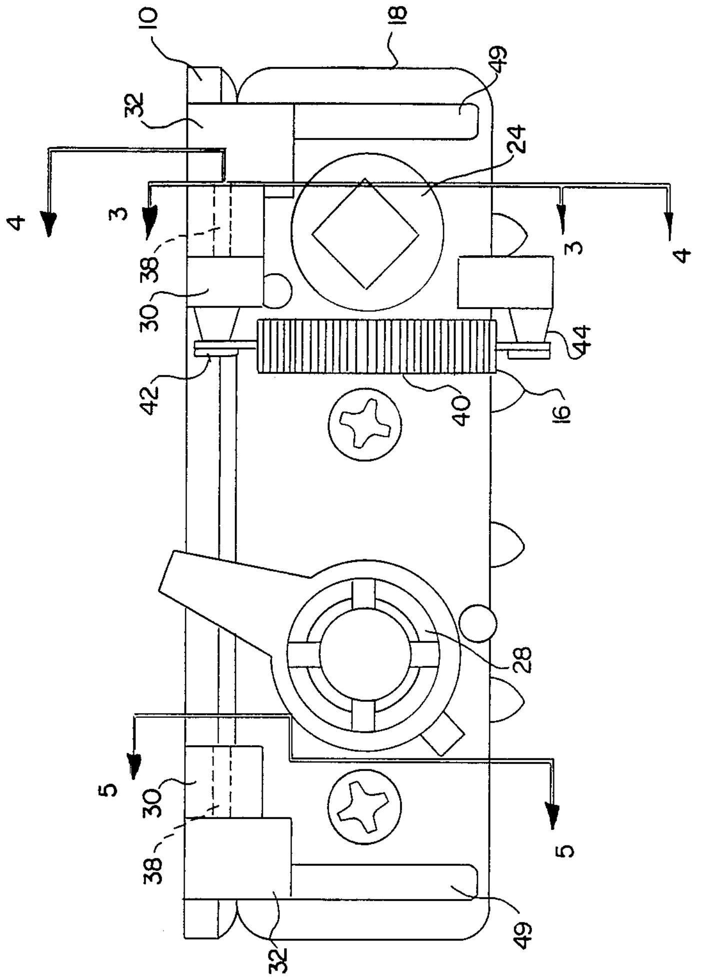
FIG. 2 is a elevation from the outside of the tractor.

The lid trunnions have openings which define journals. These journals are larger than the diameter of pins 38 which project in the same direction (toward each other, as shown in FIG. 2). Accordingly, the lid may execute both rotational and translational movement as it is manipulated between closed and open positions.

At all times the lid is positively biased towards closed position by a spring 40 which is connected to an extension 42 from the trunnion 30 and also to another member 44 which is connected to the outside side frame 20 of the frame 18.

The lid also has a projection 46 which sets the gap (the distance between the lid and the upper surface 50 of the frame 18) on which the document is disposed. This projection acts as a stop and may be located either on the lid or on the side frame.

The trunnions may be strengthened as required by backing members or strips 49, in accordance with good plastic injection molding practice; the side frame and lid all being injected molded from plastic (e.g. polycarbonate) material.

In operation, it requires merely a simple finger manipulation to pivot and translate the lid to its first (1) open position as shown in FIG. 4. Other open positions such as shown as position (2) and (3) in FIG. 4 may also be provided; the spring 40 then acting as a toggle spring as in the case of the above described Xactron tractors. It is not necessary in most cases to use positions (2) and (3). Position (1) will be quite sufficient for loading of the document on the tractor belt 14 and positioning the perforations on the pins 16. To close the tractor lid, a simple finger movement applied to the outside edge of the lid or a simple pulling on the lid trips the lid much like a trip latch over the ledge provided by the trunnion 32 and down to closed position, where the stop 46 sets the lid gap.

From the foregoing description it will be apparent that there has been provided an improved document feed tractor with a lid mechanism which may readily be implemented at low cost, without any parts additional to those presently used in tractors and which may readily be manipulated between open and closed positions.

Variations and modifications in the herein described tractor and lid structure, within the scope of the invention, will undoubtedly suggest themselves to those skilled in the art. Accordingly the foregoing description should be taken as illustrative and not in a limiting sense.

I claim:

1. In a document feed tractor having a frame which presents a surface on which a belt is disposed, said belt having pins projecting therefrom for engagement with perforations in the document to be fed, an improved lid structure comprising: a lid member moveable between a closed position spaced closely adjacent to said surface to confine the document on said frame surface and an open position spaced away from said surface to enable loading of the document with said pins and said perforations; said lid member having lid trunnions projecting over one side of said frame, said frame having frame trunnions projecting from said one side of said frame and disposed in side by side relationship with said lid trunnions; said lid trunnions or said frame trunnions defining, with pins which extend into holes larger than the diameter of said pins, journals for combined pivotal and translational movement of said lid member with respect to said frame between said open and closed positions; said frame having projections extending away from said surface and defining a ledge adjacent to said surface; said lid member having an edge overlying said ledge and disposed in supported relationship on said ledge when said lid is said open position; said lid member being translatable over said ledge and pivotable into said closed position;. and spring means attached between said frame and said lid member for biasing said lid member into its said closed position.

2. The lid structure according to claim 2 wherein one of said frame and lid has a stop outward of said pivot which projects away from said surface a predetermined distance to set the spacing between said lid and said surface.

3. The lid structure according to claim 1 wherein said projections defining said ledge are provided by said frame trunnions.

4. The lid structure according to claim 1 wherein said lid member has ears extending from said one side of said frame, said lid trunnions depending from said ears.

5. The lid structure according to claim 1 wherein said pins project laterally from said frame trunnions and said openings larger than said pins are in said lid trunnions.

6. The lid structure according to claim 5 wherein said openings are sufficiently large to enable translation of said lid over said ledge.

7. The lid structure according to claim 6 wherein said pins extend laterally in opposite directions.

* * * * *